United States Patent Office 3,449,748
Patented June 10, 1969

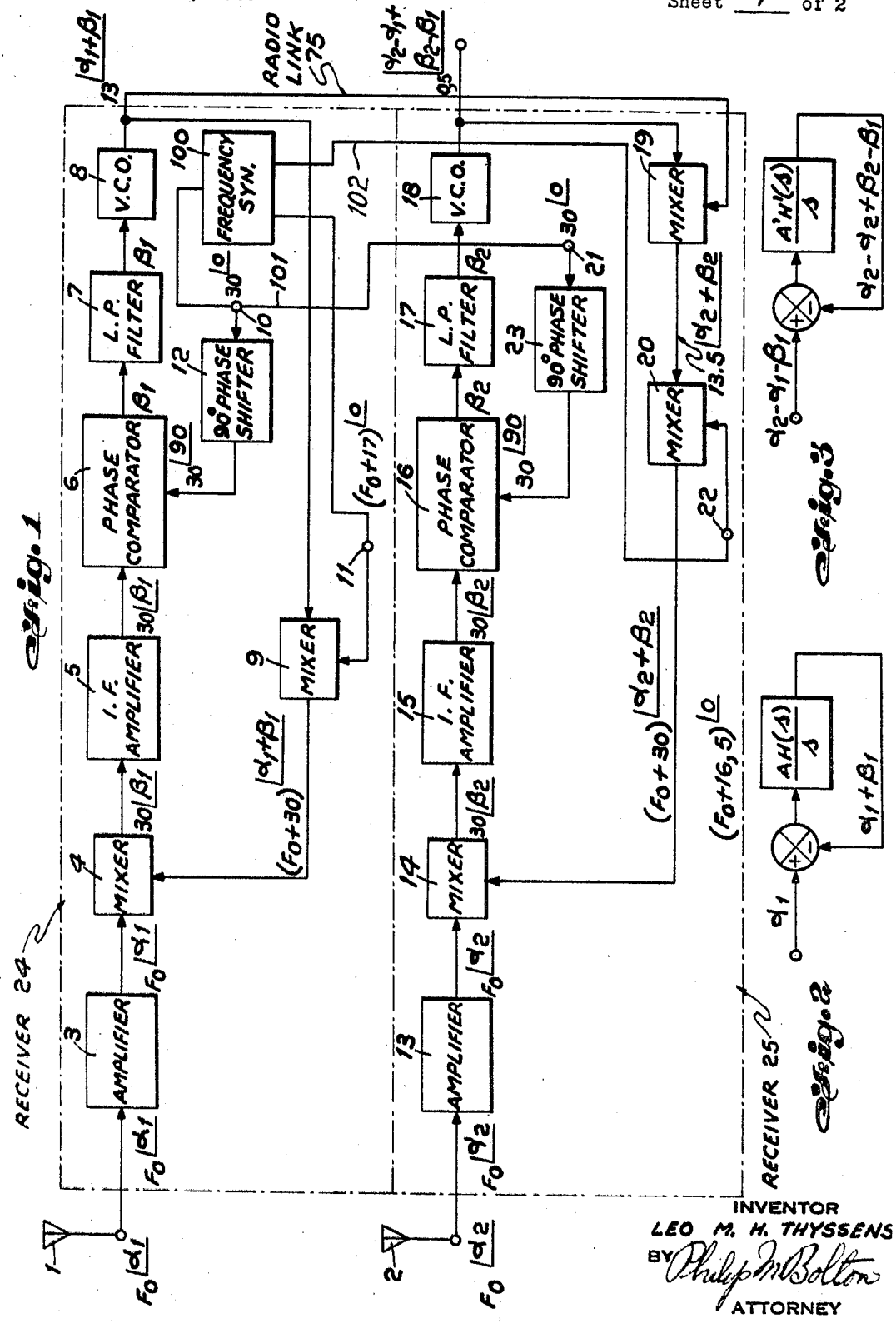

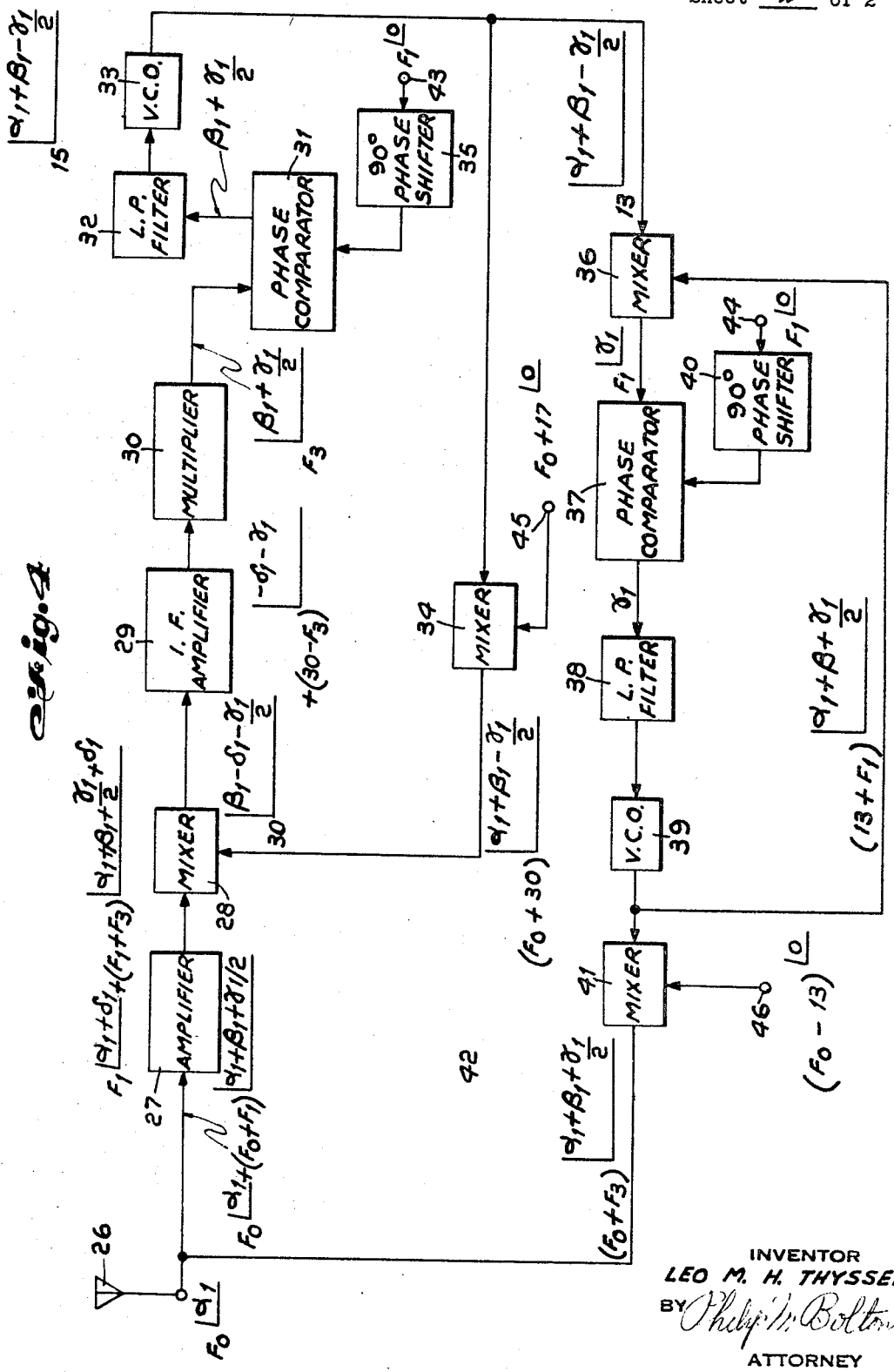

3,449,748
PHASE DIFFERENCE MEASURING SYSTEM
Leo Maria Hendrik Thyssens, Zoersel-Antwerp, Belgium, assignor to International Standard Electric Corporation, New York, N.Y., a corporation of Delaware
Filed Jan. 8, 1968, Ser. No. 696,391
Int. Cl. G01s 5/06
U.S. Cl. 343—113                    6 Claims

ABSTRACT OF THE DISCLOSURE

In a system for tracking earth satellites, the phase difference between signals received at two distant tracking stations is measured. The phase difference measuring arrangement consists of a phase-locked loop at each station, each loop including a voltage controlled oscillator (V.C.O.), and a feedback chain coupled between the input and output of the V.C.O. A phase comparator in the feedback chain compares the feedback signal with a reference signal of fixed phase. The output of the V.C.O. of the first station is injected into the feedback circuit of the second station to subtract, in effect, the phase angle seen by the first loop from that of the second loop, thereby giving the phase difference between the signals received from the satellite at the two stations.

---

The invention relates to a phase difference measuring system for measuring the phase difference between a first and a second input signal.

From the article "Tracking the Earth Satellite, and Data Transmission, by Radio" by J. T. Mengel published in the PIRE of June 1956, it is known that when a radio signal is transmitted by a satellite the phase difference between the signals then received in two distant tracking stations is proportional to the direction cosine of the satellite in one of these stations. In order that the value of this direction cosine should be known at any moment during the flight of the satellite over the tracking stations, it is clear that measurements of the above phase difference must be carried out with a high repetition frequency. When using a computer for executing these phase difference measurements, during each such measurement the two phase values to be substracted are first digitized whereafter the subtraction is made. Hence an error is produced on each of the digitized values so that also the result has a considerable error. It is clear that the latter error may considerably be reduced if the phase difference is first obtained and only afterwards digitized in the computer.

It is therefore an object of the invention to provide a phase difference measuring system capable of directly providing said phase difference.

Another object of the invention is to provide a phase difference measuring system capable of operating under adverse noise conditions.

According to the invention, the phase difference measuring system is characterized in that it includes a first phase-locked loop to the input of which said first input signal is applied and the output of which is constituted by the output of a first voltage-controlled oscillator included in said first phase-locked loop, that it includes a second phase-locked loop to the input of which said second input signal is applied and the output of which is constituted by the output of a second voltage-controlled oscillator included in said second phase-locked loop, and that a first output signal appearing at the output of said first voltage-controlled oscillator is applied in the feedback chain of said second phase-locked loop which provides a second output signal with said phase difference at the output of said second voltage-controlled oscillator.

The above mentioned and other objects and features of the invention will become more apparent and the invention itself will be best understood by referring to the following description of embodiments taken in conjunction with the accompanying drawings wherein:

FIG. 1 represents a first embodiment of a phase measuring system according to the invention;

FIG. 2 shows the servo loop of one of the receivers of the system of FIG. 1;

FIG. 3 represents the servo loop of the other of these receivers;

FIG. 4 shows a receiver forming part of a second embodiment of the phase measuring system according to the invention.

Principally referring to FIG. 1 the phase difference measuring system includes two receivers 24 and 25 which are mounted in two stations located at a predetermined distance of e.g. 10 kilometers from each other. These receivers are intercoupled by a radio link schematically indicated by reference numeral 75. By means of this system the angular position of a moving object (not shown), e.g. a satellite is measured in the station of receiver 25 by measuring the phase difference between the input signals received by the receivers 24 and 25 from the moving object which carries an emitter emitting a signal of frequency $F_0$ equal to 1.5 gc./s. and the phase of which is taken as reference phase zero. Hereby it should be noted that the frequencies of these input signals are subjected to the Doppler effect.

The input signal received by receiver 24 has a frequency $F_1 = F_0 + \Delta F_1$ mc./s., $\Delta F_1$ being equal to $\alpha_1/2\pi$ where $\alpha_1$ is the corresponding phase shift in radians with respect to the signal of frequency $F_0$ and phase angle zero, whereas the input signal received by receiver 25 has a frequency $F_2 = F_0 + \Delta F_2$ mc./s., $\Delta F_2$ being equal to $\alpha_2/2\pi$ where $\alpha_2$ is the corresponding phase shift in radians with respect to the signal of frequency $F_0$ and phase angle zero. At every instant the values of the phase shifts $\alpha_1$ and $\alpha_2$ and hence of the frequency shifts $\Delta F_1$ and $\Delta F_2$ are generally different from one another due to the distance from the moving object to the receivers 24 and 25 being generally different. It should be noted that due to the above Doppler effect the frequency shifts $\Delta F_1$ and $\Delta F_2$ vary linearly with time.

It is supposed that the input signal with frequency $F_1$ has a power of $S_i$ watts and an average noise power spectral density of X watts per cycle and per second, whilst the input signal of frequency $F_2$ has a power of $S'_i$ watts and an average noise power spectral density of X watts per cycle and per second.

The input signal of frequency $F_1$ or frequency $F_0$ and phase angle $\alpha_1$ is received in receiver 24 by antenna device 1 and amplified in the amplifier 3 having a high gain $G_1$ and a low noise figure $E_1$ and amplifying the input signal without introducing a phase shift. The output signal of this amplifier 3 is applied to the input of a phase-locked loop the aim of which is to provide an output signal of intermediate frequency and the phase and frequency of which are locked to those of the input signal. This phase-locked loop includes the frequency conversion network or mixer 4, the intermediate frequency amplifier 5, the phase comparator 6, the low pass phase lag filter 7, the voltage-controlled oscillator 8 with a center frequency of 13 mc./s. and the frequency conversion network or mixer 9.

A frequency synthesizer 100 provides at the terminals 10 and 11 signals having the reference frequencies of 30 mc./s. and ($F_0+17$) mc./s. and phase angle zero, these signals being applied to the phase comparator 6, via a 90° phase shifter 12, and to mixer 9 respectively.

The input signal of frequency $F_2$ or frequency $F_0$ and phase angle $\alpha_2$ is received in receiver 25 by antenna device 2 and amplified in the amplifier 13 having a high gain and a low noise figure and able to pass the input signal without introducing a phase shift. The output signal of this amplifier 13 is applied to the input of a phase-locked loop the aim of which is to provide an output signal of intermediate frequency and the phase and frequency of which are locked to those of the input signal. This phase-locked loop includes the frequency conversion network or mixer 14, the intermediate frequency amplifier 15, the phase comparator 16, the low pass filter 17, the voltage-controlled oscillator 18 with a center frequency of 0.5 mc./s. and the frequency conversion networks or mixers 19 and 20. The output of the voltage-controlled oscillator 8 is coupled to the one input of mixer 19 via the above mentioned radio link 75.

Frequency synthesizer 100 (via links 101 and 102) also provides at the terminals 21 and 22 signals having reference frequencies of 30 mc./s. and ($F_0+16.5$) mc./s. and phase angle zero, these signals being applied to the phase comparator 16 via a 90° phase shifter 23 and to mixer 20 respectively.

In the phase-locked loop of receiver 24 the input signal of frequency $F_0$ and phase angle $\alpha_1$ is mixed in mixer 4 with the feedback signal of frequency ($F_0+30$) mc./s. and phase angle $\alpha_1+\beta_1$ appearing at the output of mixer 9 and obtained by mixing in the latter mixer 9 the signal with a frequency of 13 mc./s. and phase angle $\alpha_1+\beta_1$ appearing at the output of the voltage-controlled oscillator 8 with the reference signal of frequency ($F_0+17$) mc./s. and phase angle zero applied to input terminal 11 by frequency synthesizer 100. The signal appearing at the output of the mixer 4 has a frequency of 30 mc./s. and an error phase angle $\beta_1$. This signal is applied via amplifier 5 to phase comparator 6 wherein the error phase angle $\beta_1$ of this signal is compared with the 90° phase angle of the reference signal with a frequency of 30 mc./s. and a zero phase angle. The DC component of the signal provided at the output of the phase comparator 6 is proportional to sin $\beta_1$ or $\beta_1$ since the error phase angle $\beta_1$ is very small. The signal appearing at the output of the phase comparator 6 is applied to the phase lag filter 7 and the output signal of this filter 7 is fed to the input of the voltage controlled oscillator 8 which provides the above mentioned signal of 13 mc./s. and phase angle $\alpha_1+\beta_1$ at its output. This output signal has a power of $S_0$ watts and a noise power of $N_0$ watts. The phase lag filter 7 which is not shown in detail is constituted by a series branch formed by a resistor $R_1$ and a parallel branch formed by the series connection of a resistor $R_2$ and a capacitor C. (See the article "Properties and design of the phase controlled oscillator with a sawtooth comparator" by C. J. Byrne published in the Bell System Technical Journal of March 1962, number 2).

In the phase-locked loop of receiver 25 the signal of frequency $F_0$ mc./s. and phase angle $\alpha_2$ is mixed in mixer 14 with the feedback signal of frequency ($F_0+30$) mc./s. and phase angle $\alpha_2+\beta_2$ appearing at the output of mixer 20. The latter signal is obtained by mixing in mixer 19 the signal with frequency 0.5 mc./s. and a phase angle $\alpha_2-\alpha_1+\beta_2-\beta_1$ appearing at the output of the voltage controlled oscillator 18 with the output signal with a frequency of 13 mc./s. and a phase angle $\alpha_1+\beta_1$ provided at the output of the voltage-controlled oscillator 8 and by then mixing the output signal of mixer 19 having a frequency of 13.5 mc./s. and a phase angle equal to $\alpha_2+\beta_2$ with the reference signal of frequency ($F_0+16.5$) mc./s. and phase angle zero applied to terminal 22. The signal appearing at the output of mixer 14 has a frequency of 30 mc./s. and a phase angle $\beta_2$. This signal is applied via amplifier 15 to phase comparator 16 wherein the phase angle $\beta_2$ of this signal is compared with the 90° phase angle of the reference signal having a frequency of 30 mc./s. and a phase angle zero. The DC component of the signal provided at the output of the phase comparator 16 is proportional to sin $\beta_2$ or to $\beta_2$ since the phase angle $\beta_2$ is very small. The signal appearing at the output of the phase comparator 16 is applied to the phase lag filter 17 and the output signal of this filter 17 is fed to the input of the voltage-controlled oscillator 18 which provides the above mentioned signal of 13 mc./s. and phase angle $\alpha_2-\alpha_1+\beta_2-\beta_1$ at its output. This output signal has a power of $S'_0$ watts and a noise power of $N'_0$ watts. The phase lag filter 17 is for instance of the same type as filter 7.

Without considering the mixers 9, 19, and 20 and the coupling between the above first and second phase-locked loops, each of these loops is of the type such as disclosed in the article "Satellite-Tracking Receiver" by W. Janeff, published in "Electrical Communication," volume 39, No. 1, 1964. The functioning of these phase-locked loops is therefore not described in detail.

The above phase-locked loop of the receiver 24 differs from the one disclosed in the last mentioned article by the fact that the signal appearing at the output of the voltage-controlled oscillator 8 is not directly fed back to the mixer 4 but is fed back via the mixer 9. The mixer 9 however does not affect the basic operation of the loop and is only used for converting the intermediate frequency of 13 mc./s. of the oscillator output signal to such a value that when mixed in mixer 4 with the frequency of the input signal an error signal with a frequency of 30 mc./s. and error phase angle $\beta_1$ is obtained.

The above phase-locked loop of the receiver 25 differs from the one disclosed in the last mentioned article by the fact that in order to provide at the output of the voltage controlled oscillator 18 a signal the phase angle of which is equal to ($\alpha_2+\beta_2$) − ($\alpha_1+\beta_1$) the output signals of oscillators 8 and 18 are mixed in mixer 19 so as to provide a signal with frequency 13.5 mc./s. and phase angle $\alpha_2+\beta_2$. The mixer 20 does not affect the basic operation of the loop and is only used for converting the intermediate frequency of 13.5 mc./s. of the output signal of mixer 19 to such a value that when in mixer 14 with the frequency of the input signal an error signal with a frequency of 30 mc./s. and error phase angle $\beta_2$ is obtained.

Reference is hereinafter made to the above article of C. J. Byrne. When calling A the open loop gain of the servo loop of the receiver 24, this loop being represented in FIG. 2, the linearized feedback equation of this loop may be written $$Y(s) = \frac{\alpha_1(s) + \beta_1(s)}{\alpha_1(s)} = \frac{AH(s)}{s + AH(s)} \quad (1)$$

wherein $H(s)$ is the transfer function of the phase lag filter 7 i.e.

$$H(s) = \frac{1+sT_2}{1+sT_1}$$

with $$T_1 = (R_1 + R_2)C$$

and $$T_2 = R_2 C$$

and wherein $s$ is a complex frequency variable, the relationship between this variable and the time variable $t$ being given by the well known formula $$F(s) = \int_0^\infty f(t)e^{-st}dt$$

In an analogous manner, when calling $A'$ the open loop gain of the servo loop of the receiver 25, this loop being shown in FIG. 3, the linearized feedback equation of this loop may be written:

$$Y'(s) = \frac{[\alpha_2(s)+\beta_2(s)]-[\alpha_1(s)+\beta_1(s)]}{\alpha_2(s)-[\alpha_1(s)+\beta_1(s)]} = \frac{A'H'(s)}{s+A'H'(s)}$$

wherein $H'(s)$ is the transfer function of the phase lag filter 17

$$H'(s) = \frac{1+sT'_2}{1+sT'_1}$$

$T'_1$ and $T'_2$ being the time constant of filter 17.

From this it follows that by intercoupling the two receivers and more particularly the two phase-locked loops the phase difference $\alpha_2-\alpha_1$ is obtained directly, with an error $\beta_2-\beta_1$, at the output of the receiver 25. This is advantageous with respect to a system wherein the phase angles $\alpha_1$ and $\alpha_2$ are measured separately, as already explained above. It should be appreciated that the system only requires a small amount of equipment.

It will be shown hereinafter that the signal-to-noise ratio of the signal appearing at the output of the system i.e. at the output of the receiver 25, is very high so that this system is capable of operating under adverse noise condition.

The receiver 24 is first considered. The absolute value $\beta'_1(s)$ of the error $\beta_1(s)$ of the phase-locked loop included therein may be written $$\beta'_1(s) = [1-y(s)]\alpha_1$$

$$\beta'_1(s) = \frac{s(sT_1+1)}{s^2T_1+s(AT_2+1)+A} \cdot \alpha_1(s)$$

$$\beta'_1(s) = \frac{s^2}{s^2+2R\omega_n s+\omega_n^2} \cdot \alpha_1(s) \quad (3)$$

The second form is obtained from the first by using Formulas 1 and 2 and the third by noting that both $sT_1$ and $AT_2$ (A large) are with respect to unity and by introducing the parameters of the loop i.e. $\omega_n$ the natural angular frequency, and R the damping ratio, defined by $$\omega_n = \sqrt{\frac{A}{T_1}} \quad (4)$$

$$R = \frac{\omega_n T_2}{2} \quad (5)$$

The input frequency is a frequency ramp due to Doppler effect so that one may write $$\alpha_1(s) = D/s^3 \quad (6)$$

wherein D is the variation of the input frequency in radians/sec².

Substituting Formula 6 in Formula 3 yields $$\beta'_1(s) = \frac{D}{s(s^2+2R\omega_n s+\omega_n^2)}$$

By applying the well known final value theorem $\lim f(t) = \lim sF(s)$ $$t \to \infty \quad s \to 0$$

steady state error $\beta'_3$ is obtained.

$$\beta'_3 = 2\pi D/\omega_n^2$$

with D expressed in cycles/sec².

The maximum value of this steady state error is then $$\beta_3 = 2\pi D_{max}/\omega_n^2 \quad (7)$$

wherein $D_{max}$ is the largest frequency variation of the input signal which can be followed by the phase-locked loop. From Formula 7 follows that $$\frac{1}{\omega_n} = \frac{1}{\sqrt{2\pi}}\sqrt{\frac{\beta_3}{D_{max}}} \quad (8)$$

The signal-to-noise ratio $S_0/N_0$ may be written $$\frac{S_0}{N_0} = \frac{S_i}{X} \cdot \frac{1}{2B} \cdot \frac{1}{E_1+\frac{E_2-1}{G_1}} \quad (9)$$

wherein $S_i$ is the power in watts of the input signal applied to receiver 24;
X is the average noise power spectral density of this signal in watts per cycle per second;
B is the low pass equivalent noise bandwidth of the loop in cycles per second;
$E_1$ is the noise figure of amplifier 3;
$E_2$ is the noise figure of the phase-locked loop;
$G_1$ is the gain of amplifier 3;
$S_0$ and $N_0$ are the power and noise power in watts of the output signal of the phase locked loop.

Substituting $$C_3 = E_1 + \frac{E_2-1}{G_1}$$

which is the combined noise figure of the amplifier 3 and the loop, Formula 9 becomes $$\frac{S_0}{N_0} = \frac{S_i \pi}{C_3 XB} \quad (10)$$

with B expressed in radians per second.

From the above article of J. Byrne it follows that when $(AT_2)^2$ is larger than $AT_1$, as is supposed to be the case in filter 7, the loop noise bandwidth B, expressed in radians per second may be written $$\frac{\pi}{2B} = \frac{2T_1}{AT_2} \quad (11)$$

Reckoning with Formulas 4 and 5 Formula 11 becomes $$\frac{\pi}{2B} = \frac{1}{R\omega_n} \quad (12)$$

Substituting Formula 8 in Formula 12 yields $$\frac{\pi}{2B} = \frac{1}{\sqrt{2\pi}R}\sqrt{\frac{\beta_3}{D_{max}}} \quad (13)$$

Finally when substituting Formula 13 in Formula 10 the latter becomes:

$$\frac{S_0}{N_0} = \sqrt{\frac{2}{\pi}} \cdot \frac{S_i}{XRC_3} \cdot \sqrt{\frac{\beta_3}{D_{max}}} \quad (14)$$

From this Formula 14 it follows that the signal-to-noise ratio $S_0/N$ of the receiver 24 is dependent on the values of $S_i$, $C_3$, X, R, $\beta_3$ and $D_{max}$. $\beta_3$ is determined by the accuracy wanted; R has to be suitably chosen e.g.

$$R = \frac{1}{\sqrt{2}}$$

D depends on the velocity of the moving object and is a constant for a given measurement; $X_1$ cannot be changed. Hence the ratio $S_0/N_0$ can only be increased by increasing $S_i$, i.e. by increasing the power of the signal emitted by the emitter of the moving object or by using a large antenna device 1 or by decreasing $C_3$ by using an amplifier 3 and a phase-locked loop with a low noise figure and an amplifier 3 with a high gain. All these solutions are however very expensive.

The receiver 25 can be considered in an analogous manner as the receiver 24 and the signal-to-noise ratio of the signal appearing at the output of this receiver can therefore be written as follows $$\frac{S'_0}{N'_0} = \sqrt{\frac{2}{\pi}} \cdot \frac{S'_i}{X'R'C'_3} \cdot \frac{\beta_4}{\Delta D_{max}}$$

wherein $\beta_4$ is the maximum steady state error. Referring to FIG. 3 the Laplace transform of the input signal may indeed be written as follows $$L[\alpha_2(t) - \alpha_1(t) - \beta_1(t)] \approx L[\alpha_2(t) - \alpha_1(t)] = \frac{D - D'}{s^3} = \frac{\Delta D}{s^3}$$

wherein D is analogous to D', but now with respect to the second loop.

The signal-to-noise ratio $S'_0/N'_0$ is hence dependent on $\Delta D$ which is much smaller than D and D' so that this ratio is much larger than the ratio $S_0/N_0$ when the other factors $S'_i$, $C'_3$, $X'$, $R'$ and $\beta_4$ are equal to $S_i$, $C_3$, X, R and $\beta_3$ respectively. The thus obtained ratio $S'_0/N'_0$ is often so large that it may be decreased by making X' larger or by decreasing $S'_i$ thus permitting the use of less expensive material. Indeed, a larger $C'_3$ permits the use of a less expensive amplifier 13 whereas the use of a less expensive antenna device 2 decreases $S'_i$ and increases X'.

A physical explanation of the high signal-to-noise ratio of the signal appearing at the output of the receiver 25 is the following. It is well known that a phase-locked loop improves the signal-to-noise ratio of a signal due to its bandwidth required for following a frequency variable signal being very small, this bandwidth being directly proportional to this frequency variation. By intercoupling the two receivers and more particularly the two phase-locked loops the phase-locked loop of receiver 25 only must follow a frequency variation which is much smaller than that which must be followed by the phase-locked loop of the receiver 24. Hence the bandwidth of the former loop of receiver 25 may also be much smaller than that of the latter phase-locked loop of receiver 24. Due to this more noise is rejected by the receiver 25 so that the signal-to-noise ratio is improved.

In the above it has implicitly been supposed that neither of the amplifiers 3 and 13 introduce a phase shift in the signals applied to their input. In case each of these amplifiers introduces such a phase shift each of the receivers 24 and 25 must be modified so as to provide an output signal which is independent from this phase shift. Principally referring to FIG. 4 such a modified receiver 42 replacing 24 of FIG. 1 will now be described. Receiver 25 may be modified in an analogous manner.

Receiver 42 includes an antenna device 26, an amplifier 27, introducing a phase shift $\delta_1$, and a phase-locked loop including a mixer 28, an intermediate frequency amplifier 29, a multiplier 30, a phase comparator 31, a low pass phase lag filter 32, a voltage controlled oscillator 33 with a center frequency of 13 mc./s., a mixer 34 and a 90° phase shifter 35. This phase-locked loop only differs from the one of FIG. 1 by the presence of the multiplier 30. Receiver 42 further includes a second phase-locked loop including a mixer 36, a phase comparator 37, a low pass phase lag filter network 38, a voltage controlled oscillator 39 with a center frequency of 13 mc./s. and a 90° phase shifter 40. The output of the oscillator 39 is coupled to the antenna device 26 via the mixer 41. The synthetizer or control device applied reference signals of frequency $F_1=1$ kc./s. at terminals 43, 44 to phase shifters 35 and 40, of frequency $(F_0+17)$ mc./s. at terminal 45 to mixer 34 and of frequency $(F_0-13)$ mc./s. at terminal 46 to mixer 41.

The output signal of the first or upper phase-locked loop has a frequency of 13 mc./s. and a phase angle $$\alpha_1 + \beta_1 - \frac{\gamma_1}{2}$$

$\gamma_1$ being the phase angle introduced by the second or lower phase locked loop. When this signal is applied to the latter second phase-locked loop it is clear from the drawing that a signal with frequency $F_0+F_1$ and phase angle $$\alpha_1 + \beta_1 + \frac{\gamma_1}{2}$$

appears at the output of the mixer 41. The latter signal is applied to the antenna device 26 together with the input signal with frequency F1 and phase angle $\alpha_1$. The amplifier 27 is supported to introduce a phase shift $\delta_1$ so that two signals appear at its output, one with frequency F1 and phase angle $\alpha_1+\delta_1$ and the other with frequency $F_0+F_1$ and phase angle $$\alpha_1 + \beta_1 + \frac{\gamma_1}{2}$$

In the mixer 28 both these signals are mixed with the feedback signal of the first phase-locked loop, the latter signal having a frequency of $(F_0+30)$ mc./s. and a phase angle $$\alpha_1 + \beta_1 - \frac{\gamma_1}{2}$$

The two output signals of mixer 28 hence have a frequency of 30 mc./s. and $30-F_1$ mc./s. and a phase angle $$\beta_1 - \delta_1 - \frac{\alpha_1}{2}$$

and $-\delta_1-\delta_1$ respectively. These signals are amplified in amplifier 29 and then multiplied in the multiplier 30 so that a signal with frequency $F_1$ and phase angle $\beta_1+\gamma_1/2$ appears at the output of this multiplier. By applying the thus obtained signal to the filter 32 and by feeding the output signal of this filter to the oscillator 33 it is clear that the above output signal with a frequency of 13 mc./s. and a phase angle $$\alpha_1 - \beta_1 - \frac{\gamma_1}{2}$$

is obtained. This phase angle is hence independent from the phase shift $\delta_1$ introduced by the amplifier 27.

While the principles of the invention have been described above in connection with specific apparatus, it is to be clearly understood that this description is made only by way of example and not as a limitation on the scope of the invention.

I claim:
1. A system for measuring the phase difference between a first and second input signal comprising:
   a first phase-locked loop including a first voltage controlled oscillator and a first feedback chain coupled between the output of said first voltage controlled oscillator and its input;
   a second phase-locked loop including a second voltage controlled oscillator and a second feedback chain coupled between the output of said voltage controlled oscillator and its input;
   means for applying a first and second input signal to the inputs of said first and second phase-locked loops, respectively;
   the outputs of these loops being obtained at the outputs of their voltage controlled oscillators; and
   means for applying the output of said first voltage controlled oscillator in the feedback chain of the second phase-locked loop to provide a second output signal with said phase difference at the output of said second voltage controlled oscillator.

2. A system according to claim 1, in which said first and second phase-locked loops are located in two different separated stations.

3. A system according to claim 2, in which said first and second input signals are of the type received from a moving object generating a signal with a single frequency.

4. A system according to claim 1 in which each feedback chain comprises:

means for mixing the feedback signal with the respective input signal;

means including a phase comparator for comparing the phase of the mixed signal with a reference signal of fixed phase; and means coupled to the output of said phase comparator for controlling the frequency of the voltage controlled oscillator.

5. A system according to claim 4, wherein each said feedback chain further includes means for converting the frequency of the feedback signal before mixing it with the input signal.

6. A system according to claim 4, wherein said means coupled to the output of said phase comparator includes a phase lag filter.

References Cited

UNITED STATES PATENTS

| | | | |
|---|---|---|---|
| 3,251,062 | 5/1966 | Ghose | 343—117 X |
| 3,340,532 | 9/1967 | Glomb et al. | 343—113 |

RODNEY D. BENNETT, JR., *Primary Examiner.*

RICHARD E. BERGER, *Assistant Examiner.*

U.S. Cl. X.R.

324—83, 85